(12) United States Patent
Krein et al.

(10) Patent No.: US 7,310,355 B1
(45) Date of Patent: Dec. 18, 2007

(54) APPARATUS AND METHOD FOR POWERING A NETWORK DEVICE

(75) Inventors: Todd Krein, San Jose, CA (US); Robert Spies, Moss Landing, CA (US); Toby Farrand, Los Gatos Hills, CA (US); Steve Young, Los Gatos, CA (US); Michael Sleator, Woodside, CA (US)

(73) Assignee: Digeo, Inc., Kirkland, WA (US)

( * ) Notice: Subject to any disclaimer, the term of this patent is extended or adjusted under 35 U.S.C. 154(b) by 1031 days.

(21) Appl. No.: 10/227,120

(22) Filed: Aug. 23, 2002

(51) Int. Cl.
*H04J 1/10* (2006.01)

(52) U.S. Cl. .................... 370/492; 370/486

(58) Field of Classification Search ............ 725/74, 725/82, 127, 75, 76, 79, 80, 85, 126, 128; 705/74, 75, 76, 79, 80, 82, 85, 126, 127, 705/128; 370/400, 401, 485, 490, 487, 492, 370/501, 488, 486, 482
See application file for complete search history.

(56) References Cited

U.S. PATENT DOCUMENTS

| 6,348,874 B1 * | 2/2002 | Cole et al. ............. 340/825.01 |
| 6,622,304 B1 * | 9/2003 | Carhart ..................... 725/74 |
| 2002/0069417 A1 * | 6/2002 | Kliger et al. ................ 725/78 |

* cited by examiner

*Primary Examiner*—Brenda Pham
(74) *Attorney, Agent, or Firm*—Kory D. Christensen; Stoel Rives LLP

(57) ABSTRACT

A system is described comprising: a first node coupled to a second node by a communications network, the first node and second node communicating digital and/or analog signals over the communications network; the first node comprising a power output selector module to apply a specified voltage to the communications network to power one or more devices communicatively coupled to the communications network; and the second node using the voltage to provide power to one or more electrical components.

19 Claims, 10 Drawing Sheets

APPARATUS AND METHOD FOR POWERING A NETWORK DEVICE

BACKGROUND

1. Field of the Invention

This invention relates generally to the field of multimedia distribution. More particularly, this invention relates to an apparatus and method for distributing power using existing network wiring.

2. Description of the Related Art

With the advent of personal video recording on digital media and broadband networks capable of streaming video content, distribution of video in a home is an increasingly important problem to solve. In particular, methods for video distribution must be low cost, convenient to install, and reliable and must also deliver high-quality results. Many digital networking approaches are being used in an attempt to solve this problem.

The home phone networking alliance ("HPNA") has proposed standards for delivering Internet Protocol ("IP") data over telephone lines in the home. For video distribution, these solutions typically involve encapsulating MPEG-compressed video into IP packets. Set-top devices connected to TVs then receive the IP data, de-encapsulate the MPEG data, decode the MPEG data into A/V streams and present the stream to the television or other display device. Typically the set top box will also include a graphics processor to present a user interface. A variant of HPNA is HPNA-C in which similar protocols are used, but the home's coaxial wiring is used as a physical media rather than phone lines. Similar digital networks have been proposed to use the home's AC wiring, or wireless digital networks at 2.4 GHz and 5 GHz bands.

Approaches using phone lines are not ideal for video distribution since most home A/V centers do not have phone lines running to them. AC and wireless distribution systems are of doubtful reliability for time-sensitive streamed media such as audio and video. HPNA-C has the advantage of being based on a medium that is well suited to high-bandwidth signal propagation, but the fact that it is based on digital transmission of the audio and video content leads to the disadvantage of requiring an expensive set top box at the receiving TV to decode the compressed audio and video and present a user interface to interact with the user.

While there are clear advantages to using the home's coax network to distribute video in either digital or analog form, there is one major problem to be overcome for coax to provide reliable communication between any two locations in the home. The home coax network typically consists of cable and splitters that are interconnected and designed to support a broadcast network wherein, as illustrated in FIG. 1, data originates from a root splitter 100 and propagates in one direction through a tree of downstream splitters 102, 104. While it is increasingly common for cable modems to share this coaxial infrastructure to provide signaling back through the root splitter 100 to the cable network 110, it is uncommon for the various nodes 120-123 of the coaxial network to communicate with each other.

One impediment to such communication between nodes within the home is the fact that most splitters 100, 102, 104 are designed to maximize the attenuation of signals between the split legs of the splitter. This attenuation is minimally 25 dB and may be much higher. So, the home coaxial network is well suited for signals passing between the root splitter 100 and the various nodes 120-123 but poorly suited for communicating between the nodes 120-123 themselves since this requires passing signals through paths with high attenuation.

One obvious solution to this problem is to rewire the home to have all of the nodes 120-123 in the home wired directly to a root device which would act as a hub to distribute data to the other nodes in the house. One problem with this approach is that reinstalling the coax in the home is labor-intensive and expensive. Accordingly, what is needed is a system and method which allows nodes within the home coaxial network to communicate with one another in a manner which is compatible with analog transmission of multimedia signals as well as digital. What is also needed is a system and method which can be employed using existing coaxial network configurations.

SUMMARY

A system is described comprising: a first node coupled to a second node by a communications network, the first node and second node communicating digital and/or analog signals over the communications network; the first node comprising a power output selector module to apply a specified voltage to the communications network to power one or more devices communicatively coupled to the communications network; and the second node using the voltage to provide power to one or more electrical components.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the invention.

Overview of an Exemplary Multimedia System

Prior to describing embodiments of the apparatus and method for powering a network device, which is the focus of this application, an overview of an exemplary multimedia storage and playback system is provided. It should be noted, however, that many of the specific details of the multimedia system set forth below are not necessary for implementing the underlying principles of the invention. Embodiments of the exemplary multimedia system are set forth in the co-pending application entitled MULTIMEDIA AND COMPUTING SYSTEM, filed Sep. 1, 2000 (Ser. No. 09/653,964), which is assigned to the assignee of the present application and which is incorporated herein by reference.

Figure 1:
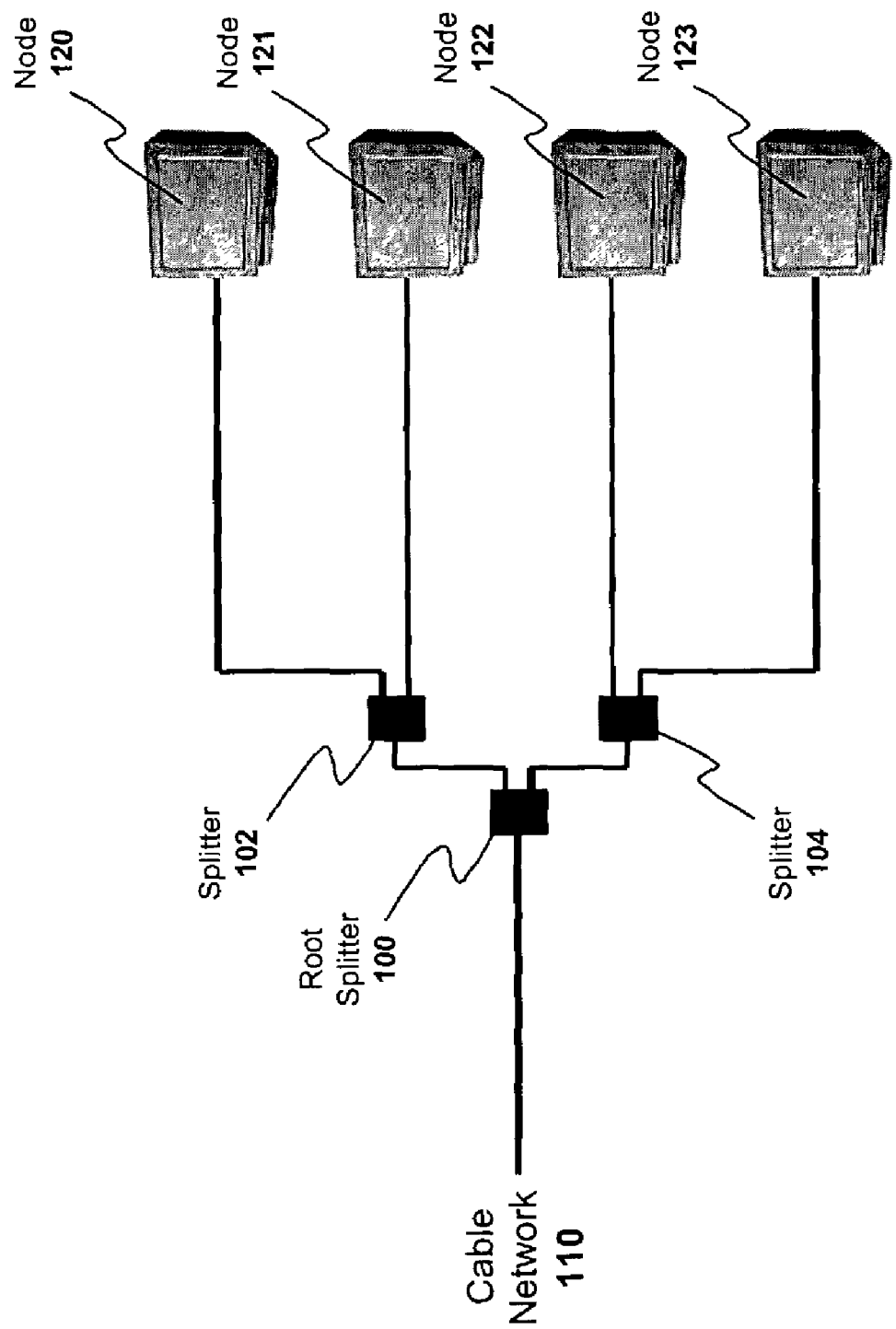
FIG. 1 illustrates the wiring of a typical home coaxial network.
Figure 2:
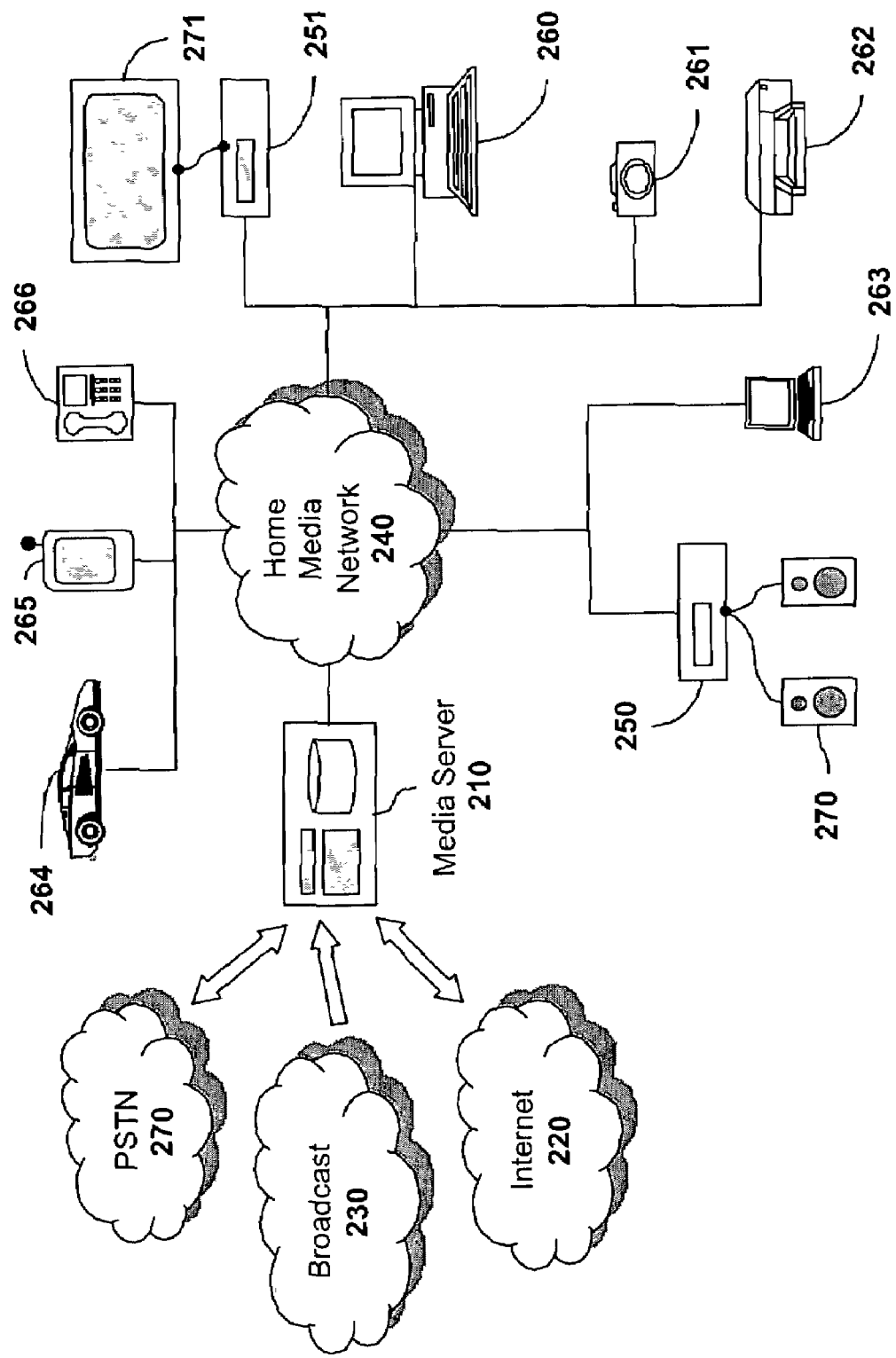
FIG. 2 illustrates one embodiment of a multimedia distribution system including a media server.

As illustrated in FIG. 2, in one embodiment of the multimedia system, a media server 210 (e.g., a "set-top box" or game console) equipped with a processor and a mass storage device acts as a central repository for decoding and storing multimedia content and distributing the multimedia content to a plurality of nodes. More particularly, the media server 210 processes multimedia content from Internet communication channels 220 (e.g., DSL, cable modem), broadcast communication channels 230 (e.g., digital/analog cable, satellite), and/or Public Switched Telephone Network ("PSTN") communication channels 270 (i.e., standard telephone) to provide a stable, real-time home media network 240 for a plurality of network devices 250-251, 260-266.

Figure 3:
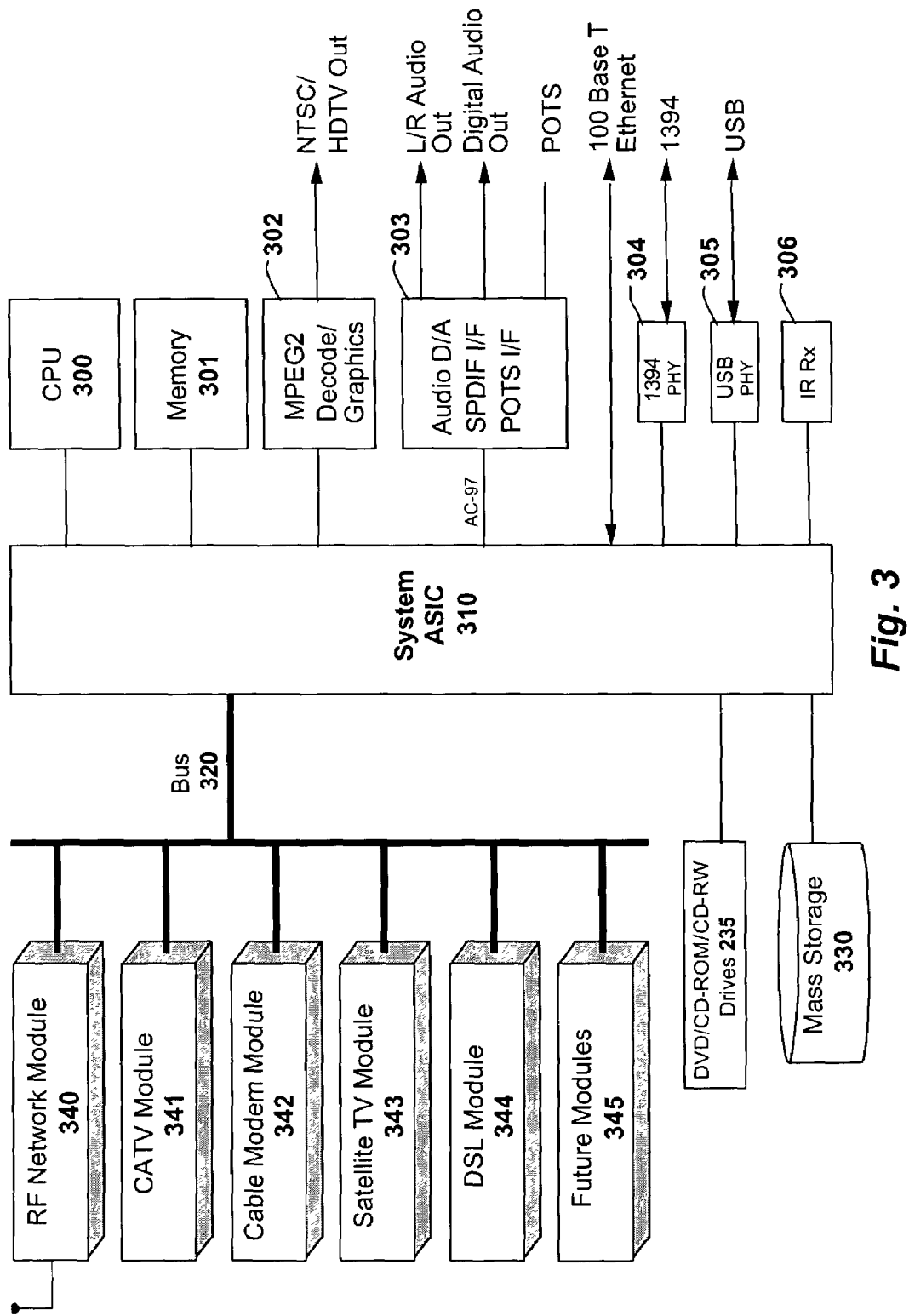
FIG. 3 illustrates hardware employed in one embodiment of the media server.

FIG. 3 generally illustrates the hardware employed in one embodiment of the media server 210 including a central processing unit 300 capable of processing program code, data and multimedia content stored in main memory 301 and a mass storage device 330 for storing program code, data and multimedia content. In one embodiment, the central processing unit 300 is a Pentium®-class processor such as a Pentium III® operating at a 1 GHz or faster clock frequency. However, various alternate processors may be employed. The main memory 301 may be a random access memory or any other dynamic storage medium (e.g., SDRAM, DDRAM, RD-RAM, . . . etc). The mass storage device 330 of one embodiment is capable of storing hundreds, or even thousands of hours of multimedia content (e.g., movies, digital audio, . . . etc) as well as other types of digital data (e.g., computer programs, word processing documents, . . . etc). Data is transmitted to/from the mass storage device 330 over a high speed interface such as an enhanced IDE interface with Ultra DMA capabilities or a Small Computer System Interface ("SCSI"). However, various other interfaces may be employed while still complying with the underlying principles of the invention.

An application-specific integrated circuit ("ASIC") 310 coordinates communication between the various system components and offloads certain designated processing tasks from the CPU. The ASIC 310 may be custom built based on the requirements of the media server 210 or may be built using gate arrays, standard cells or programmable logic devices.

Communication modules 340-345 electrically coupled to the media server 210 via a system bus 320, allow the media server 210 to communicate over different local and remote communication channels. In one embodiment, the system bus 320 is a peripheral component interconnect ("PCI") bus, although various other bus types may be configured within the media server 110 (e.g., ISA, EISA, Micro Channel, VL-bus . . . etc).

In the particular embodiment illustrated in FIG. 3, the communication modules 340-345 electrically coupled to the system bus 320 include an RF network module 340 for communicating over the home media network 240 (i.e., via a wireless RF channel), a cable TV module 341 for receiving broadcast cable channels over the cable network, a cable modem module 342 for providing Internet access via a cable system (i.e., using the TCP/IP protocol), a satellite TV module 343 for receiving satellite broadcasts, and a DSL module 344 for DSL Internet access. Moreover, a virtually unlimited number of new modules may be added as necessary to support new or existing communication channels/protocols (as indicated by module 345).

Other components within the media server 110 architecture include an MPEG-2 decoder module 302 (and/or other decoder modules such as AC3, MPEG-4, Real Video 8 . . . etc); an audio module 303 comprised of a digital-to-analog converter, a Sony-Philips Digital Interconnect Format ("SPDIF") interface and a standard telephony interface for providing digital and analog audio and standard telephone service to external audio/telephony devices; an Ethernet port provided directly the system ASIC 310 (as indicated by the "100 Base-T Ethernet" designation); a Firewire (IEEE 1394) port 304; a Universal Serial Bus ("USB") port 305; and an infrared port 306. Various additional/alternate communication interfaces may be configured in the system, either directly on the primary media server architecture 210 (e.g., on the media server 110 "motherboard"), or as an add-on module 340-345. Moreover, the communication modules (e.g., 302-306), the CPU 300 and/or the memory 301 may be incorporated within the system ASIC 310, rather than as separate modules as illustrated in FIG. 3.

Embodiments of the media server 210 may also be equipped with a DVD drive, CD player, CD Read-Write drive, DVD Read-Write drive, and/or any other type of portable storage medium 335. In one embodiment, these devices may communicate with the media server 210 via an AT Attachment Packet Interface ("ATAPI"), although the type of interface used is not pertinent to the underlying principles of the invention.

Referring again to FIG. 2, numerous digital or analog devices or "nodes" may be configured to communicate with the media server 210 over the home media network 240. By way of example, and not limitation, these include personal computers 260, cameras or digital camcorders 261, printers 262, notebook computers 263, automotive audio/video systems 264, cell phones or personal digital assistants 265, standard telephones 265 (including fax machines), home security systems (not shown); and/or home climate control systems (not shown).

Distributed multimedia nodes 250 and 251 illustrated in FIG. 2 provide an interface to the home media network 240 for audio systems 270 (e.g., audio amplifiers and speakers) and/or additional video systems 271 (e.g., standard television sets, wide screen television sets, high definition television ("HDTV") sets, or any other device capable of displaying video).

In one embodiment of the invention, the media server 210 is capable of concurrently processing and storing multiple broadcast programs transmitted over the broadcast communication channels 230. One such system is described in the co-pending application entitled A SYSTEM AND METHOD FOR PROCESSING MULTIPLE BROADCAST MULTIMEDIA STREAMS, filed Feb. 20, 2001 (Ser. No. 09/789,861) (hereinafter "Multiple Stream Application") which is assigned to the assignee of the present application and which is incorporated herein by reference.

Embodiments of an Apparatus and Method for Distributing Audio and Video Content

Figure 4:
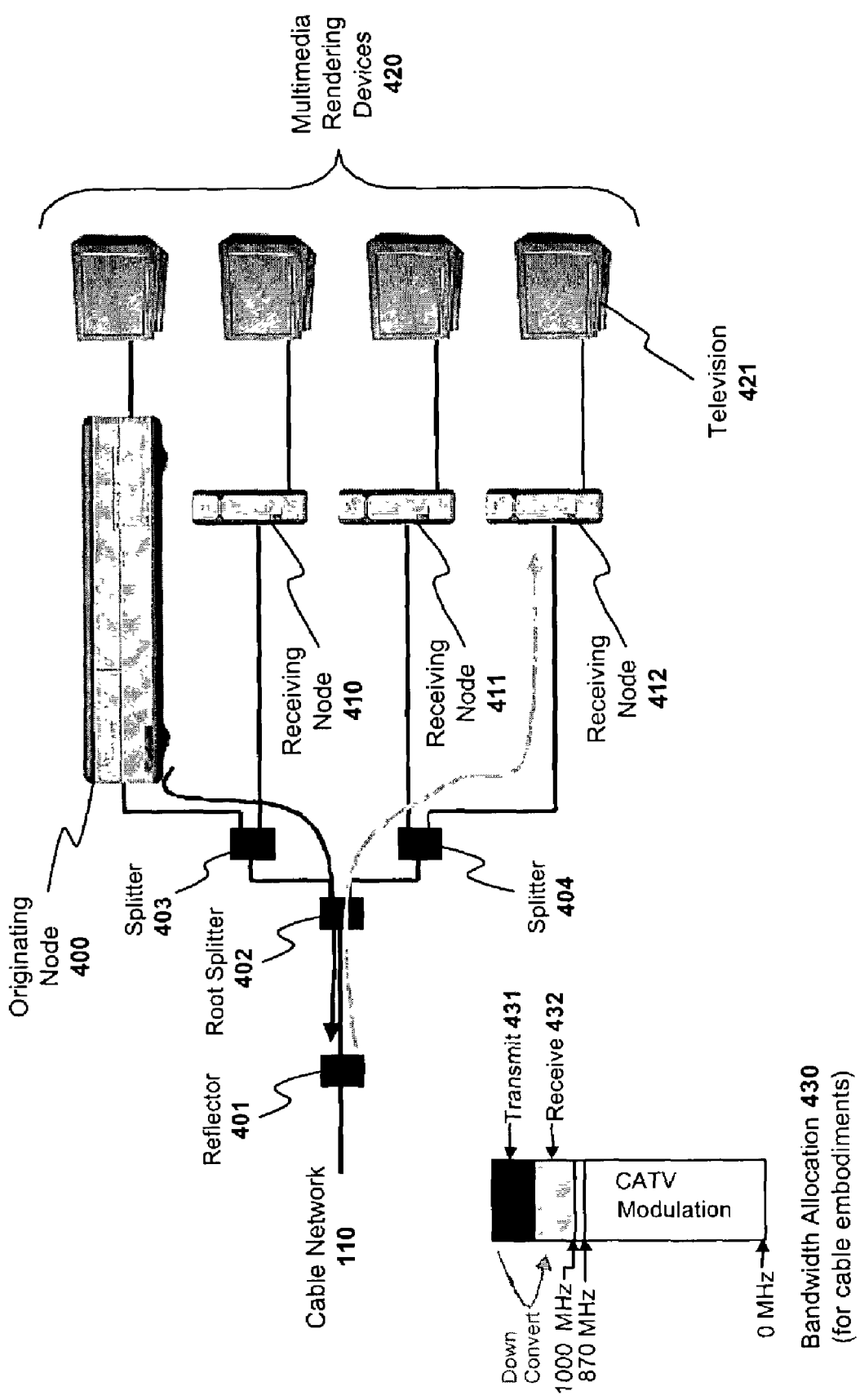
FIG. 4 illustrates an originating node (e.g., a media server) communicating with a plurality of receiving nodes according to one embodiment of the invention.

In one embodiment of the invention, illustrated in FIG. 4, a signal reflector device 401, communicatively coupled between the cable network 110 and the root splitter 402, reflects signals transmitted from the nodes 400, 410-412 of the home network back towards the nodes. For example, a signal transmitted from the originating node 400 illustrated in FIG. 4 will initially pass through splitter 403 followed by the root splitter 402 before reaching the reflector device 401. The reflector device 401 will then reflect the signal back to one of the receiving nodes (e.g., through the root splitter 402 and splitter 404 to reach receiving node 412). As will be described in detail below, the entire reflected signal may propagate along each branch of the splitter tree but only selected portions of the signal may be received and processed by each individual receiving node. For example, each of the receiving nodes 410-412 may be configured to receive signals transmitted from the originating node 400 at a specified carrier frequency. Alternatively, the originating node 400 may transmit data packets containing addresses of specified receiving nodes (e.g., such as TCP/IP packets). The underlying principles of the invention remain the same regardless of how the underlying data is modulated and/or packetized, and regardless of whether the underlying data remains in analog form or is in digital form.

The terms "upstream" and "downstream" as used herein is based on the direction in which cable signals are transmitted from the external cable network 110 (or, rather, the direction in which cable signals would be transmitted if the user were a cable subscriber). Thus, generally speaking, the external cable network 110 is "upstream" relative to the local cable network 110 illustrated in FIG. 4. Similarly, the root splitter 402 is located "upstream" relative to splitters 403 and 404 because a signal transmitted from the external cable network would pass through the root splitter before reaching splitters 402 and 403.

In one embodiment, the originating node 400 is comprised of the hardware/software architecture of the media server 210 described above (or elements thereof). For example, in one embodiment, the originating node 400 concurrently stores and processes content from multiple cable and/or satellite channels as well as other types of multimedia content (e.g., MP-3 audio content ripped from compact disks, Internet content, . . . etc). In addition, as described in the Multiple Stream Application mentioned above, the originating node 400 may concurrently provide live and/or pre-recorded programs to each of the receiving nodes 410-412 (illustrated as distributed multimedia nodes 250-251 in FIG. 2) and may temporarily buffer each of the live programs for "trick mode" functions (e.g., such as pause and rewind of live programs). The buffered and/or pre-recorded program content may be stored on the originating node's 400's mass storage device 330.

The originating node 400 may also be comprised of a completely different architecture than that shown in FIG. 3. For example, the originating node 400 may simply be a DVD player, an MP3 player, a cable/satellite receiver, or an off-air antenna (i.e., equipped with a transmitter for transmitting to the receiving nodes 410-412). In addition, the originating node 400 does not necessarily need a hard drive to comply with the underlying principles of the invention. In short, the particular architecture illustrated in FIG. 3 is one of a vast number of potential embodiments.

In one embodiment, each of the receiving nodes 410-412 is configured to transmit certain types of data back to the originating node 400 via the reflector device 401. For example, control data may be transmitted to identify to the originating node 400 which channels, recorded program content and/or other data the originating node 400 should transmit to each of the receiving nodes 400-402. Examples of these control functions and other information transmitted from the receiving nodes 410-412 is described in greater detail below.

In one embodiment, the signal reflector device 401 down-converts the frequencies at which signals are reflected so as to circumvent any canceling action of the various splitters 402-404. For example, as indicated by the bandwidth allocation 430 shown in FIG. 4, the first 0-1000 MHz of spectrum may be reserved for incoming cable channels. This 1000 MHz limit may vary from operator to operator depending on the frequency plan for the particular operator in question. The attenuation characteristics of most community cable plants are such that most operators typically leave unutilized spectrum above 750 MHz, 860 MHz or 1000 MHz depending on their particular plant configuration. Above this cable operator cutoff frequency, a "transmit" block of spectrum 431 and a "receive" block of spectrum 432 may be defined for signals transmitted towards and reflected away from the reflector device 401, respectively, which do not interfere with the cable services being provided below the cable operator cutoff frequency. In one specific embodiment, the transmit block 431 is defined to be between 1200 MHz and 1400 MHz and the receive block is defined to be between 1000 MHz and 1200 MHz. However, the particular manner in which bandwidth is allocated is not pertinent to the underlying principles of the invention. For example, the transmit block 431 and receive block 432 illustrated in FIG. 4 may be reversed (i.e., signals may be transmitted at a relatively lower frequency than at which they are received). The blocks may also be widened or narrowed, depending on the particular bandwidth requirements of the system.

In one embodiment, if the signal transmitted from the originating node 400 is too weak when it arrives at the reflector device 401 (i.e., if it is below some predefined minimum signal strength value), then various additional steps may be taken to provide a stronger signal. For example, in one embodiment, the splitters 402 and 403 leading to the reflector device 401 may be replaced with devices that attenuate the signal less along the reverse path (e.g., directional couplers). A separate cable may also be run directly from the originating node 400 back to either the reflector device 401 and/or to the root splitter 402. Alternatively, or in addition, the signal transmission power may be increased at the originating node 400 as required to provide an adequate signal at the reflector device 401.

While the reflector device 401 shown in FIG. 4 is positioned upstream relative to the root splitter 402 (i.e., between the root splitter 402 and the external cable network 110), the reflector device 401 may also be positioned downstream of the root splitter 402 while still complying with the principles of the invention (i.e., between the root splitter 402 and splitters 403 and 404).

An Exemplary Reflector Device

Figure 5:
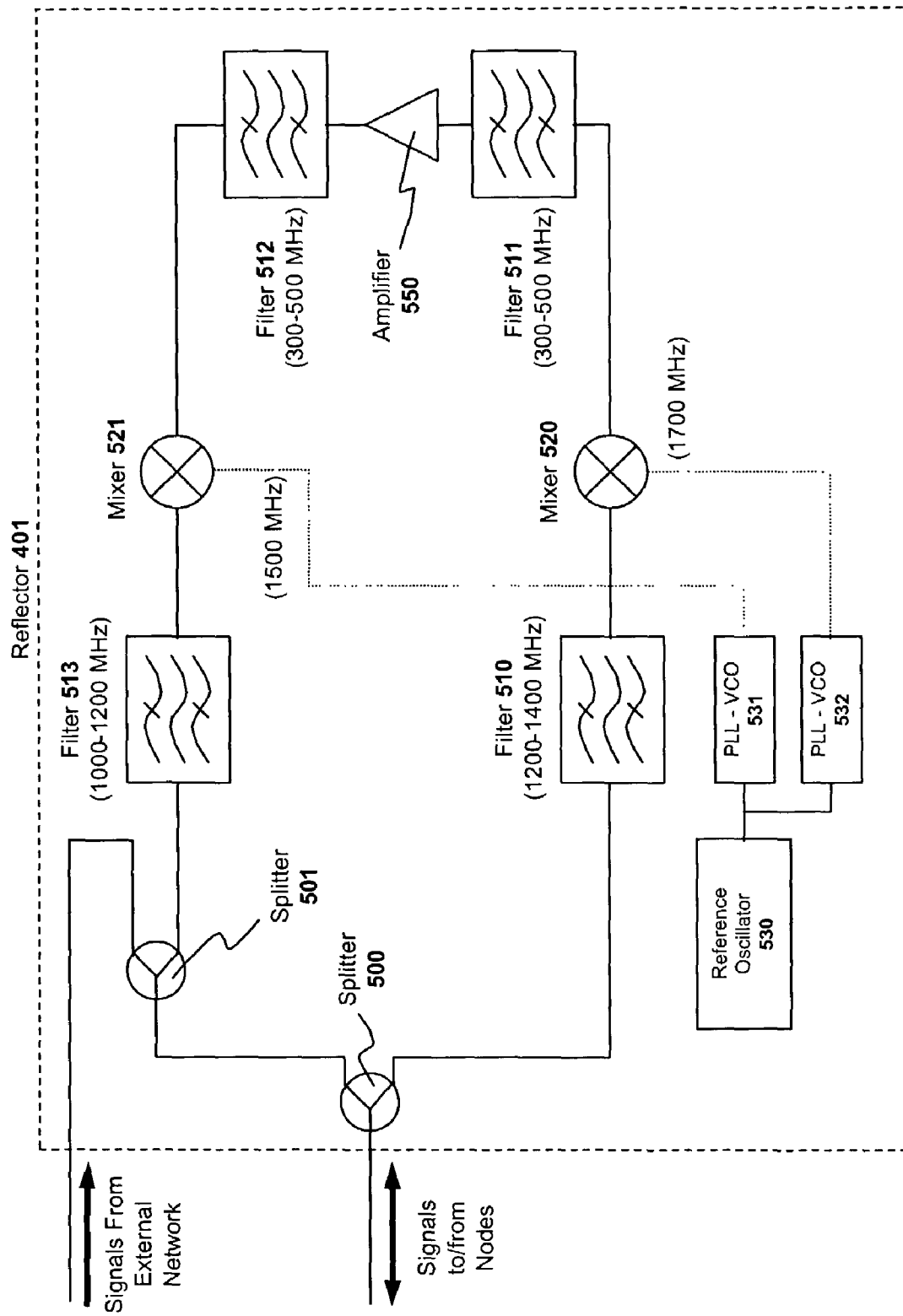
FIG. 5 illustrates a reflector device according to one embodiment of the invention.

A reflector device 401 employed in one embodiment of the invention is illustrated in FIG. 5. Signals transmitted from the originating node 400 within the 1200-1400 MHz frequency block arrive at the reflector device 401 at the input to splitter 500. The signals are initially filtered by bandpass filter 510 to remove unwanted frequencies outside of the desired frequency range (e.g., 1200-1400 MHz in the illustrated embodiment). A mixer 520 down-converts the filtered signal by mixing it with a local oscillator (LO) signal at a specified frequency provided by a phase-locked loop (PLL)/voltage-controlled oscillator (VCO) unit 532. As is known in the art, the VCO/PLL unit 532 generates the LO signal based on a signal provide by a reference oscillator 530.

The output of the mixer 520 has a frequency band equal to the difference of the frequencies of the input signal and the LO signal. Accordingly, in the illustrated embodiment, with the LO set to 1700 MHz, the output signal has a center frequency of 400 MHz (1700 MHz-1300 MHz (center frequency of the input signal)) and the same bandwidth as the input signal, ranging from 300 MHz to 500 MHz. The output signal from the mixer 520 is then filtered by bandpass filter 511 to remove frequencies outside of the desired range—300 MHz to 500 MHz in the illustrated example. An amplifier 550 then amplifies the signal by a specified amount and a second filter 512 again filters the signal within the desired 300 MHz to 500 MHz range. In one embodiment, the amplifier 550 is a linear amplifier which amplifies the signal by an equal amount, regardless of frequency. However, various amplifier types may be employed while still complying with the underlying principles of the invention. For example, an amplifier with tilt compensation may be provided to amplify the higher frequency portions of the signal more than the lower frequency portions of the signal (e.g., because the higher frequency portions will tend to experience more attenuation passing through the network cable and splitters 500-501).

Once filtered by filter 512, the signal is then passed through mixer 521 which mixes the signal with a 1500 MHz LO signal. The resulting signal, having a center frequency at 1500 MHz–400 MHz=1100 MHz is then filtered by bandpass filter 513 to remove unwanted frequency components before being transmitted back to the nodes 400, 410-412 through splitter 501 followed by splitter 500.

The various "splitters" described throughout this detailed description (e.g., splitters 500 and 501) may be standard Wilkenson splitters and/or any other type of device capable of splitting an electromagnetic signal. In one embodiment, splitter 500 and splitter 501 are directional couplers which provide relatively lower attenuation to signals transmitted through one particular leg. For example, in order to maximize the strength of the signal received from the external cable network, the attenuation across this leg to the input of splitter 500 may be configured to be relatively lower (e.g., 1 dB) than the attenuation between the other leg and the input of splitter 500 coupled to filter 513 (e.g., 9 dB). Splitter 501 may be similarly configured to maximize the input signal strength. In this embodiment, the amplifier 550 may be adjusted accordingly to ensure that the reflected signal is strong enough to reach each of the receiving nodes 410-412. As used herein, the term "split point" refers to a physical point on a network at which a splitter is communicatively coupled to split an electromagnetic signal.

In one embodiment, the reflector device 401 replaces the root splitter 402, as opposed to being coupled upstream of it. In this embodiment, the reflector device may be comprised of additional signal splitting elements (e.g., such as those in a standard Wilkenson splitter or directional coupler) in addition to the signal processing elements described above.

While the exemplary reflector device 401 illustrated in FIG. 5 employs a two-step frequency conversion process, i.e., initially converting the signal to an intermediate frequency range of 300-500 MHz before converting it to the final frequency range of 1000-1200 MHz, such a limitation is not required for complying with the underlying principles of the invention. For example, based on the particular input frequency of the signal and the desired output frequency, an intermediate frequency range may not be required. In addition, the various reflector device components may be arranged in a different order than that illustrated in FIG. 5. For example, the amplifier 550 may be configured at virtually any stage along the signal transmission path (i.e., rather than between filters 511 and 512, as illustrated). Moreover, more than one amplifier may be employed along the signal transmission path. Finally, certain elements may be removed entirely from the reflector device 401 while still complying with the principles of the invention (e.g., filter 512).

An Exemplary Signal Transmitter/Receiver

Figure 7A:
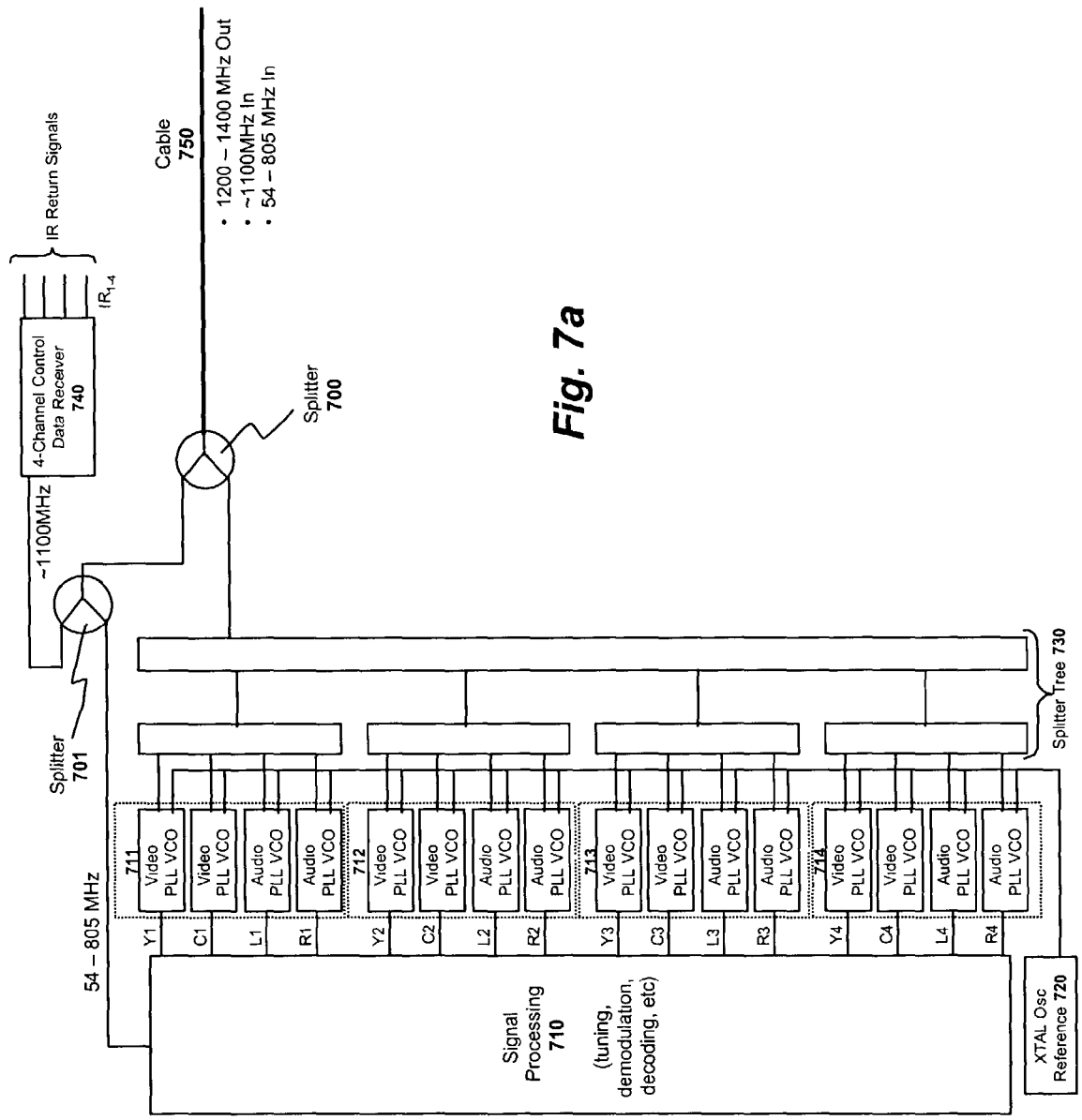
FIG. 7a illustrates transmitter and receiver portions of an originating node according to one embodiment of the invention.

FIG. 7a illustrates one embodiment of the transmitter/receiver logic employed within the originating node 400. If the originating node 400 is comprised of a "media server" architecture such as that illustrated in FIG. 3, then the illustrated transmitter/receiver logic may be configured within the cable television module 341. Alternatively, the transmitter/receiver logic may be configured directly on the media server motherboard (e.g., within the system ASIC 310, or as a separate, non-modular communication port). The underlying principles of the invention remain the same regardless of how the transmitter/receiver logic is configured within the originating node.

Figure 7B:
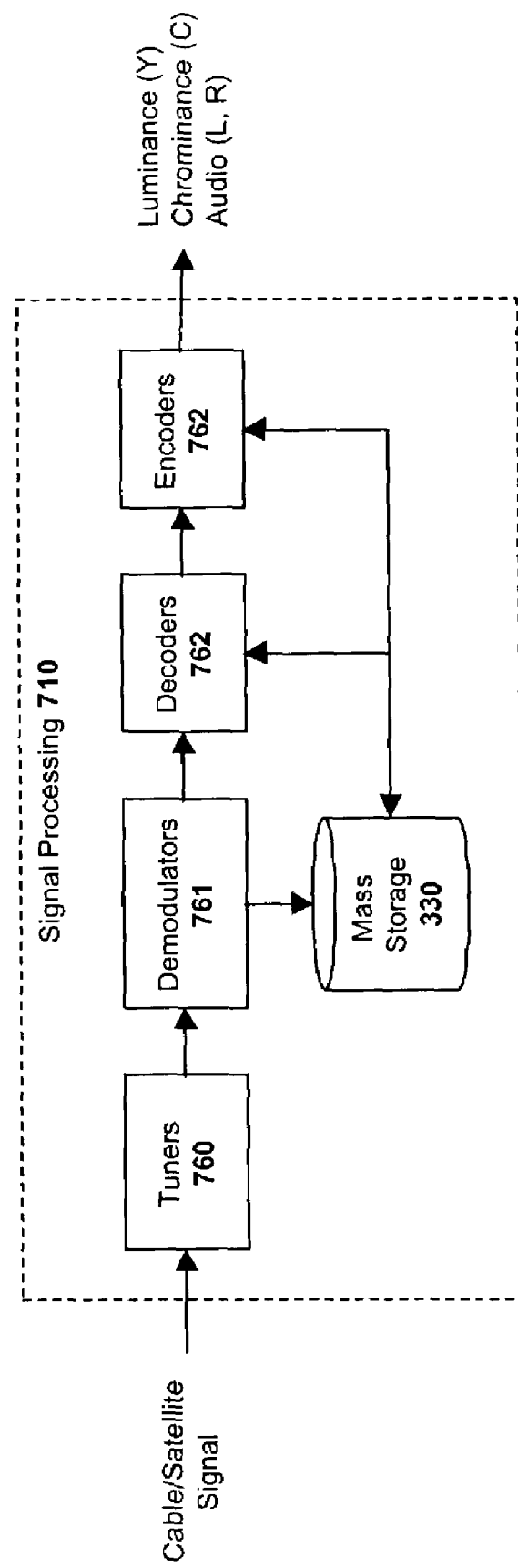
FIG. 7b illustrates signal processing logic employed in one embodiment of the originating node.

The originating node 400 receives the incoming cable signal through splitter 700 and splitter 701. The signal is then processed by signal processing block 710 to extract the underlying audio and video content. As illustrated in FIG. 7b, this may be accomplished using one or more tuners 760, demodulators 761, and decoders 762. The tuners 760 lock on to portions of the signal transmitted at a particular carrier frequency and down-convert the signals to baseband signals. The baseband signals are then demodulated via the demodulators 761. If the received signal is a cable signal the demodulators are typically Quadrature Amplitude Modulation ("QAM") demodulators and if the received signal is a satellite signal then the demodulators are typically Differential Phase Shift Keying ("DPSK") demodulators. The demodulated signals are then decoded via one or more decoders 762. If the demodulated signal is a digital signal, the decoders may be MPEG-2 decoders; for analog channels the decoders may be standard NTSC, PAL, or SECAM decoders. Of course, the underlying principles of the invention are not limited to any particular type of decoder or demodulator.

In one embodiment, encoders 762 encode the signal according to a specified format before transmitting the signal to the receiving nodes 420-422. Alternatively, depending on the manner in which the audio/video content is to be retransmitted, the encoders 762 may not be required. For example, the signal generated by the decoders 762 may be in an audio/video format which the receiving nodes 420-422 can properly interpret (e.g., luminance, chrominance and audio). As such, no additional encoding may be required. The demodulated, decoded, and/or re-encoded signals may also be stored on the mass storage device 330 for trick modes and/or for long term storage (as described above).

In one particular embodiment, the video signals generated by the signal processing logic 710 are separated into luminance (Y) and chrominance (C) components and the audio signals are separated into audio left (L1) and audio right (L2) components. As illustrated in FIG. 7a, PLL/VCO blocks 711-714 independently modulate each of the audio and video components using a different carrier frequency. A reference clock 720 is provided to each of the PLL/VCO blocks 711-714 by oscillator reference unit 720. In one embodiment, the specific modulation technique employed by the PLL/VCO blocks 711-714 is Frequency Modulation ("FM"). Modulating the Y, C and audio L, R components using FM allows the signal strength to be significantly lower than that required for standard multimedia signaling formats (e.g., standard NTSC). This is due, in part, to a phenomenon known as "capture effect" in which only the stronger of two FM signals at or near the same frequency will be demodulated. Suppression of the weaker signal occurs at the receiver, where it is treated as noise and rejected. Various alternate modulation techniques may be employed, however, while still complying with the underlying principles of the invention, including S/PDIF or other digital forms of audio.

The modulated audio and video signals are then combined on the same output cable via a "splitter tree" 730 and pass back out into the local cable network via splitter module 700 (i.e., to be reflected back to the receiving nodes 410-412 by the reflector device 401). The "splitter tree" may be comprised of various different types of physical interconnections including, but not limited to, standard Wilkenson splitters and/or transmission line couplers.

An Exemplary Transmission Spectrum

Figure 8:
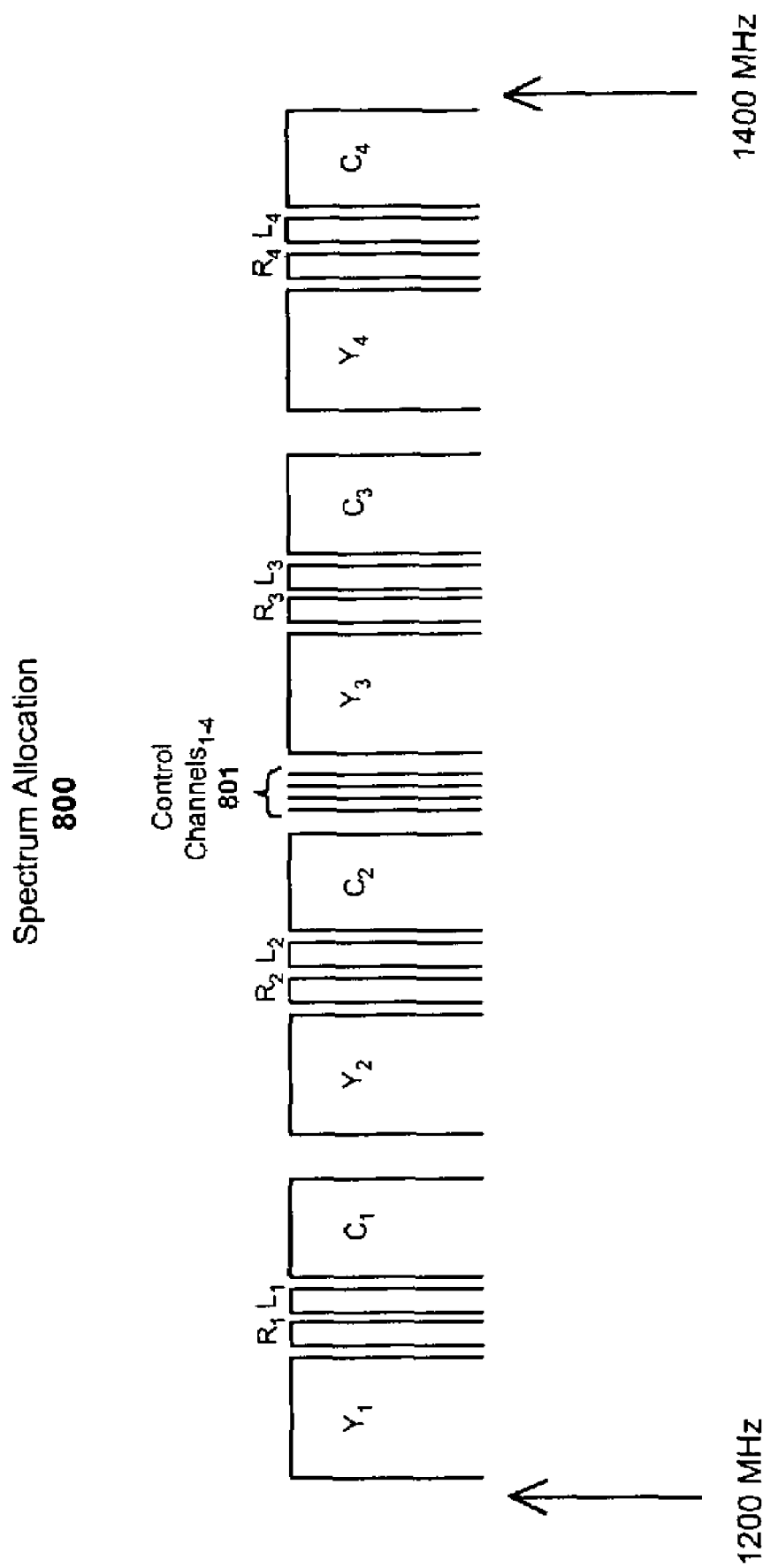
FIG. 8 illustrates a spectral allocation for a plurality of receiving nodes according to one embodiment of the invention.

FIG. 8 illustrates an exemplary spectral allocation 800 for the audio and video signals transmitted by the transmitter shown in FIG. 7a. As described above, luminance ($Y_{1-4}$), chrominance ($C_{1-4}$) and audio ($L_{1-4}$, $R_{1-4}$) components are individually modulated within different frequency blocks ranging between 1200 MHz and 1400 MHz.

In addition, in one embodiment, a block of spectrum is reserved for control channels 801 over which the receiver nodes 410-412 transmit data to the originating node 400 (or, potentially, to one another). This data is received by a control signal receiver 740 configured on the originating node 400. In one embodiment, the control data identifies the particular multimedia content (e.g., broadcast content, audio content, . . . etc) which the originating node should transmit to each remote node 410-412. For example, one user may be watching a live television program at node 410, a second user may be watching a recorded movie at node 411, and a third user may be browsing the Internet at node 412. In each case, control data sent to the originating node 400 over the control channels will indicate which multimedia content and other data to transmit to each receiving node 410-412. As described below, this information may be provided by each user via a remote control input device.

User authentication data may also be transmitted over the control channels, identifying which user is "logged in" at each of the remote nodes 410-412. The originating node 400 may use this information to restrict certain types of content at certain nodes. For example, if a child is logged in at one of the nodes, certain movies (e.g., those rated R, PG-13, . . . etc), programs and/or Internet sites may be restricted at that node (e.g., as defined by a parent or other "system administrator").

In addition, in one embodiment, the control data includes a received signal strength indication ("RSSI") value transmitted periodically (e.g., every few days, every week, . . . etc) from each receiving node 410-411. The RSSI value is used by the originating node 400 to determine the power level at which it should transmit the audio and video signals to each individual receiving node 410-412. Alternatively, if a non-linear amplifier is used in the reflector device 401, the reflector device 401 may use the RSSI values itself to determine the amount by which it should amplify each individual audio and video signal (i.e., using a higher level of amplification for those nodes with lower RSSI indications). In one embodiment, upon receiving the RSSI values from the receiving nodes 410-412, the originating node 400 communicates to the reflector device 401 how to adjust the non-linear amplifier.

The particular transmission scheme and spectral allocation represented in FIG. 8 is not required for implementing the underlying principles of the invention. For example, the "control channels" may be used to transmit any kind of information between nodes. Moreover, a single "originating" node which transmits multimedia content in a unidirectional manner to a plurality of "receiver" nodes is not required for implementing the invention. In one embodiment, several nodes (or every node in the system) may be configured to transmit and/or receive and process multimedia content.

An Exemplary Receiver Node

Figure 6:
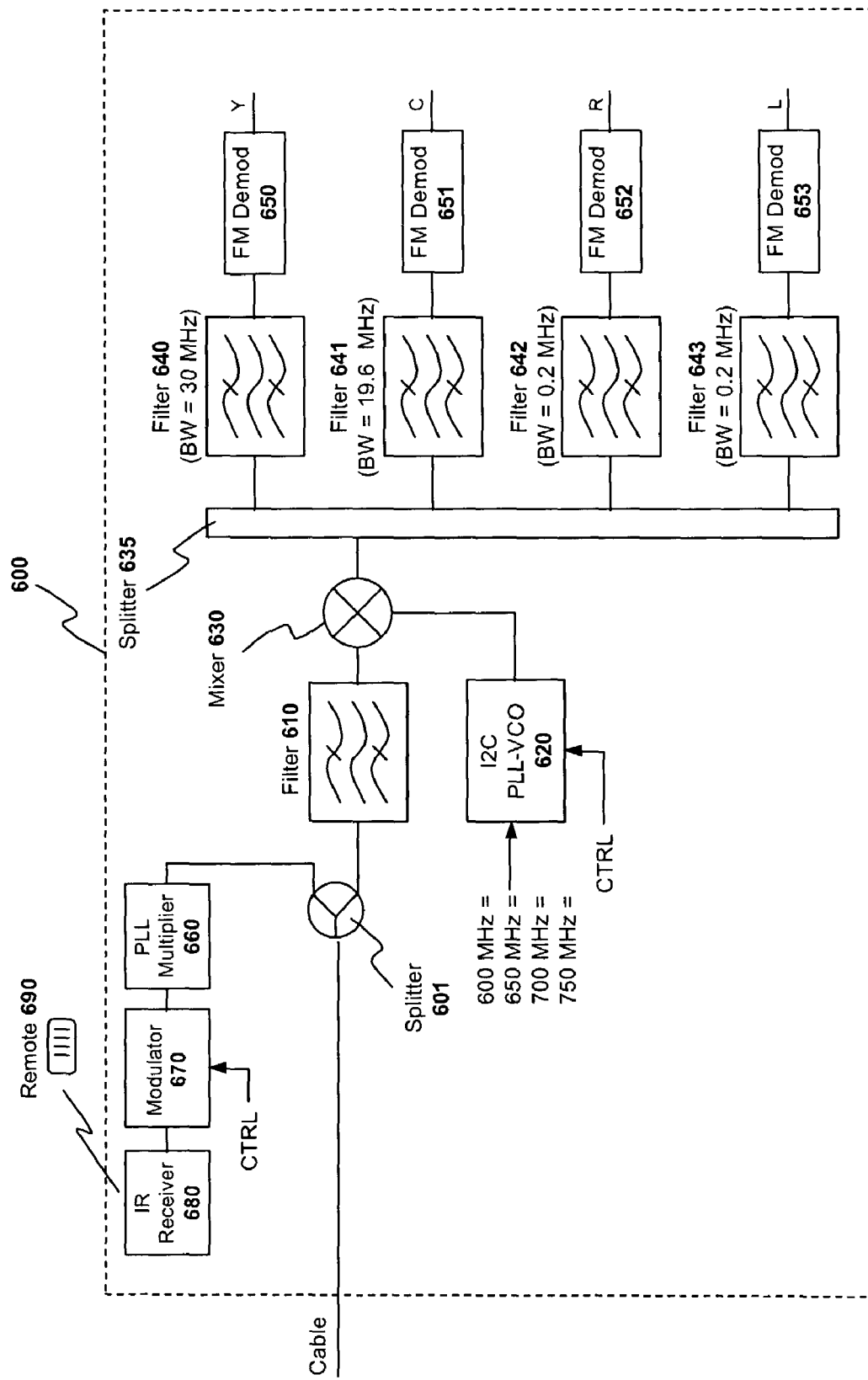
FIG. 6 illustrates portions of a receiver node according to one embodiment of the invention.

One embodiment of a receiver node 600 is illustrated in FIG. 6. Incoming audio and video signals transmitted from the originating node 400 pass through splitter 601 to bandpass filter 610 which removes frequencies outside of the desired frequency range. The "desired" frequency range is based on the particular audio and video signals which the receiver is configured to receive. For example, if the receiving node 600 is configured to receive audio and video from the frequency band containing $Y_2$, $C_2$, $L_2$, and $R_2$ shown in FIG. 8, then the bandpass filter 610 will remove all signals outside of this frequency band.

The individual Y, C, L, and R frequency bands are then down-converted via a mixer unit 630 which mixes the signals with four different frequencies provided by PLL/VCO 620. The four different frequencies are selected based on the carrier frequencies of the Y, C, L, and R signals. Each of the four down-converted signals are then individually filtered by filter modules 640-643. The luminance Y and chrominance C portions of the signal are filtered by filters 640 and 641, respectively, and the right and left audio portions of the signal are filtered by filters 642 and 643, respectively. The four down-converted, filtered signals are then demodulated by FM demodulator units 650-653 to extract the underlying audio and video information, which may be used by a television or other multimedia component to render the multimedia content.

One embodiment of the receiver node 600 is equipped with an IR receiver unit 680 (or, alternatively, an RF receiver unit) for receiving control signals transmitted from a remote control unit 690 which identify the multimedia content and other data that the originating node 400 should transmit to the receiver node 600. The control signals may also originate from a hard-wired input device such as, for example, a USB keyboard or mouse, or from control buttons configured on the front panel of the receiver node 600 (not shown). The control signals are modulated by a control signal modulator 670 which, in one embodiment is a Phase Shift Keying ("PSK") modulator (e.g., a DDS PSK unit). The modulated control signals are then transmitted at a specified carrier frequency provided via a PLL multiplier unit 660. As previously described, the carrier frequencies defined for the control channels are illustrated in FIG. 8 (i.e., control channels 801). However, the underlying principles of the invention are not limited to any particular modulation technique or any particular control channel frequency allocation.

Once transmitted, the control signals are reflected by the reflector device 401 back towards the originating node 400, which processes the control signals as described above.

In one embodiment, the reflector device 401 is used to shift the frequency of a band of carriers used by the cable service provider to a frequency above the cable operator cutoff frequency for transmission in the local cable network and specifically to the originating node 400. The reflector device 401 then blocks the original band of carriers from intruding into the local cable network of the home from the cable service provider thereby clearing a band of frequencies below the cable operator cutoff frequency for reuse for communication within the home. This enables the originating node 400 to use this cleared band of frequencies to transmit standard video broadcast signals (e.g., NTSC, PAL, SECAM, . . . etc) back to the reflector device 401, which then shifts their frequencies within the cleared band and retransmits them to cable-ready televisions and/or the receiver nodes 410-412. In other words, by using standard video modulation below the cable operator cutoff frequency, the need for a receiver node is eliminated since any cable-ready TV is able to tune directly to the signals being generated by the originating node 400.

Powering the Reflector Device

In one embodiment, power needs to be delivered to the reflector device 401 so that it can amplify the signal and perform the other signal processing functions described herein. Various techniques may be employed to power the reflector device 401 including plugging the device into a standard outlet if one is available (e.g., a standard 120 V AC outlet). Alternatively, in one embodiment, the originating node 400, or other network device, provides a DC voltage across the cable network (e.g., 9 V) which is used to power the reflector device. The originating node 400 may also transmit an RF power signal at a specified frequency (e.g., 22 KHz) which is rectified by the reflector device and converted into power. Alternatively, the originating node 400 may transmit a high frequency signal which is down-converted to a relatively lower frequency signal by the reflector device 401. The reflector device 401 may then use the energy generated from the down-conversion to power itself.

Figure 9:
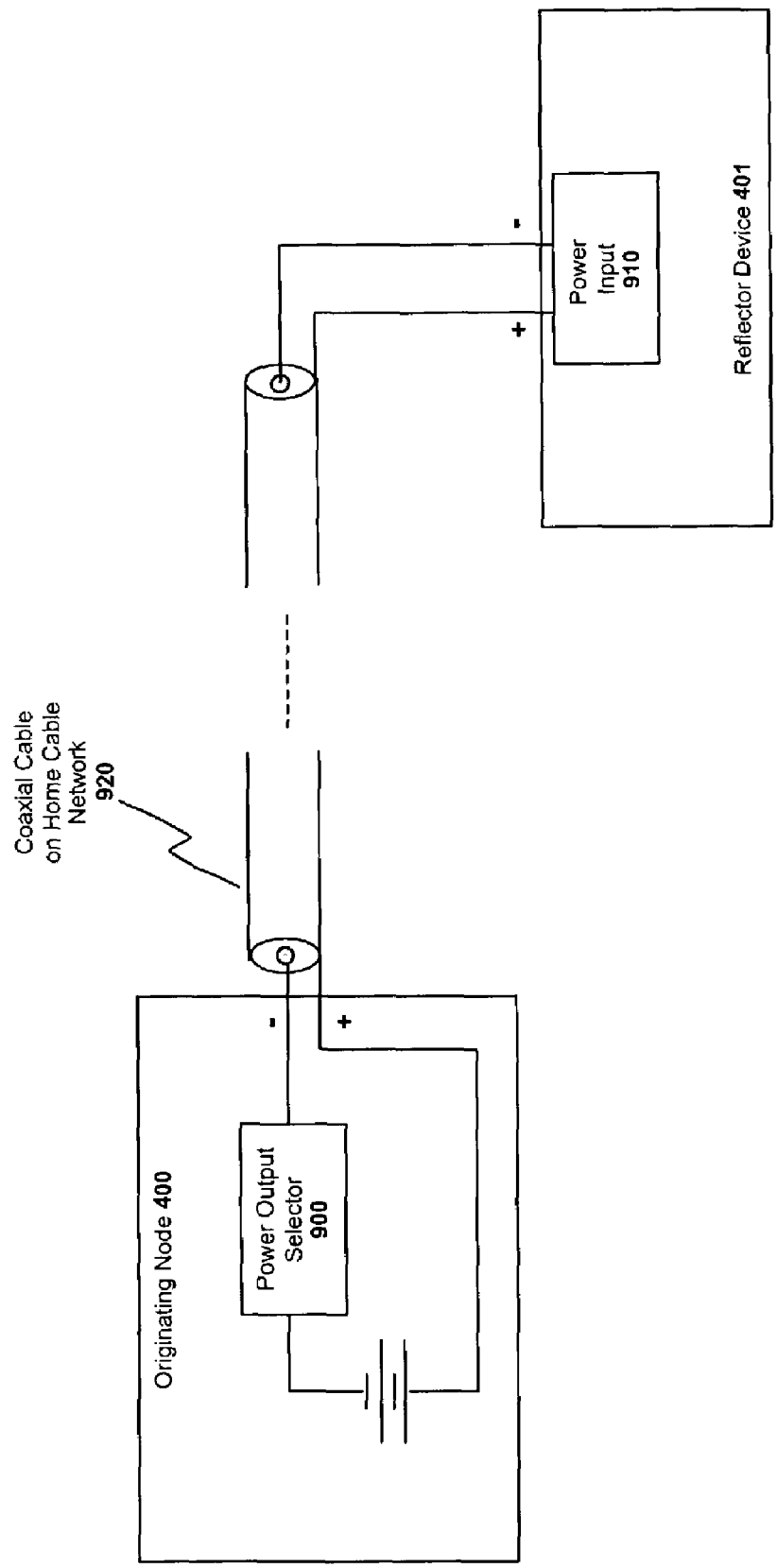
FIG. 9 illustrates one embodiment in which a first network node provides power to a second network node over a coaxial cable network.

FIG. 9 illustrates an embodiment in which the reflector device 401 is powered from the originating node 400. A power output selector module 900 applied a specified voltage between the inner and outer conductors of the coaxial cable 920 of which the network is comprised. In one embodiment, the power output selector 900, or portions thereof, are implemented in software executed by the originating node's 400's CPU. However, the power output selector 900 may also be comprised of a (hard-wired electrical switch, or any other type of electrical or mechanical switch. The voltage is used by a power input unit 910 on the reflector device 401 to provide power the various components of the reflector device 401 (e.g., amplifier 550).

Power amplifier taps are typically provided on the cable provider network which are capable of re-amplifying the cable signal and also providing a DC voltage on the incoming coaxial cable. In one embodiment, these taps (commonly referred to as "Bias T") may be set to provide power to the reflector device 401. More specifically, these taps provide an AC-coupled DC-blocking path for the signal frequencies (e.g., between two F-connectors), and an AC-blocking DC-passing path (e.g., from one of the F-connectors to a third connector suitable for DC or low frequency AC power). One side of the power circuit is connected to the coax shield to provide the DC voltage.

Embodiments of the present invention include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of embodiments of the present invention. It will be apparent, however, to one skilled in the art that these embodiments may be practiced without some of the specific details. For example, while the embodiments of the originating node 400 described above employ FM modulation techniques, various alternate modulation techniques, both analog and digital, may be employed (e.g., Phase Modulation, Amplitude Modulation, Amplitude-Shift Keying, Frequency-Shift Keying, Phase-Shift Keying, . . . etc).

In addition, while the audio and video information transmitted by the originating node 400 described above is separated into its luminance (Y) chrominance (C) and audio (L, R) components, various alternate audio/video representations may be used (e.g., component video (YCbCr), HPNA-C, MPEG-2 streaming, Dolby® digital or DTS surround sound, . . . etc).

Moreover, while described above in the context of a coaxial cable network, many aspects of the invention may be employed on other physical media types including, but not limited to, standard telephone networks. In one embodiment, the originating node 400 and the receiving nodes 410-412 may be configured to communicate with one another wirelessly (e.g., according to the 802.11a, 802.11b or Bluetooth standards). For example, the originating node may be configured to transmit multimedia content wirelessly to any receiving nodes which are not located near cable outlets. Similarly, the control channels transmitted from the receiving nodes may be transmitted wirelessly back to the originating node 400.

Although described above in the context of a cable service provider, many principles set forth above may be implemented with a satellite service provider as well. For example, the originating node 400 may receive, process and retransmit satellite signals to the receiving nodes 410-412 using many of the retransmission techniques described above. Finally, various different audio interfaces may be employed to provide audio within the apparatus and method described above (e.g., the Sony/Philips Digital Interface ("S/P DIF")).

In addition, while described above in the context of a single originating node 400 which provides multimedia content and data to a plurality of receiving nodes, the invention may be implemented with any number of "originating nodes" and "receiving nodes" (e.g., the originating node is not necessarily a set-top box).

Accordingly, the scope and spirit of the invention should be judged in terms of the claims which follow.

What is claimed is:

1. A system, comprising:
a first node comprising a transmitter to transmit modulated signals carrying multimedia data over a coaxial cable and power generation circuitry to provide a voltage over said coaxial cable; and
a reflector apparatus communicatively coupled to said coaxial cable to receive and process said signals transmitted by said first node and to retransmit said signals to a third node communicatively coupled to said coaxial cable, said reflector apparatus further having a power input electrically coupled to said coaxial cable to power said reflector apparatus using said voltage provided by said first node.

2. The system as in claim 1 wherein said reflector apparatus comprises:
frequency shifting means for converting said signals transmitted by said first node from a first frequency range to a second frequency range.

3. The system as in claim 2 wherein said reflector device further comprises:
an amplifier for amplifying said signals by a specified amount prior to transmitting said signals to said third node.

4. The system as in claim 1 wherein said multimedia data comprises cable programming transmitted over said coaxial cable by a cable service provider.

5. The system as in claim 1 wherein said multimedia data comprises satellite programming transmitted via a satellite dish communicatively coupled to said first node by a satellite service provider.

6. A system comprising:
a first node coupled to a reflector apparatus by a coaxial cable, said first node and reflector apparatus communicating digital and/or analog signals carrying multimedia data over said coaxial cable and said reflector apparatus to retransmit said signals to a third node communicatively coupled to said coaxial cable;
said first node comprising a power output selector module to apply a specific voltage to said coaxial cable to power one or more devices communicatively coupled to said coaxial cable; and
said reflector apparatus using said voltage to provide the only source of power to one or more electrical components.

7. The system as in claim 6 wherein one of said electrical components is a signal amplifier to amplify said digital and/or analog signals.

8. The system as in claim 7 wherein said specified voltage is a DC voltage.

9. The system as in claim 6 wherein said reflector apparatus comprises:
frequency shifting means for converting said signals transmitted by said first node from a first frequency range to a second frequency range.

10. The system as in claim 6 wherein said reflector apparatus further comprises:
an amplifier for amplifying said digital and/or analog signals by a specified amount prior to transmitting said signals to said third node.

11. The system as in claim 6 wherein said digital and/or analog signals are comprised of cable programming transmitted over said coaxial cable by a cable service provider.

12. The system as in claim 6 wherein said digital and/or analog signals are comprised of satellite programming transmitted via a satellite dish communicatively coupled to said first node by a satellite service provider.

13. A method comprising:
communicatively coupling a first node and a reflector apparatus on a wired coaxial cable, said first node and said reflector apparatus communicating data signals including multimedia data across said coaxial cable said reflector apparatus to retransmit said data signals to a third node communicatively coupled to said coaxial cable;
said first node applying a specified voltage on said coaxial cable to power said reflector apparatus; and
said reflector apparatus using said specified voltage to provide the only source of power to one or more electrical components.

14. The method as in claim 13 wherein one of said electrical components is a signal amplifier to amplify said digital and/or analog signals.

15. The method as in claim 14 wherein said specified voltage is a DC voltage.

16. The method as in claim 13 wherein said reflector apparatus further converts said data signals transmitted by said first node from a first frequency range to a second frequency range.

17. The method as in claim 13 wherein said reflector apparatus further amplifies said data signals by a specified amount prior to transmitting said data signals to said third node.

18. The method as in claim 13 wherein said data signals are comprised of cable programming transmitted over said coaxial cable by a cable service provider.

19. The method as in claim 17 wherein said data signals are comprised of satellite programming transmitted via a satellite dish communicatively coupled to said first node by a satellite service provider.

* * * * *